US009965362B2

United States Patent
Manohar et al.

(10) Patent No.: US 9,965,362 B2
(45) Date of Patent: May 8, 2018

(54) SYSTEMS AND METHODS FOR PERFORMING DATA RECOVERY IN A MEMORY SYSTEM

(71) Applicant: SanDisk Technologies LLC, Plano, TX (US)

(72) Inventors: Abhijeet Manohar, San Jose, CA (US); Chris Avila, Saratoga, CA (US)

(73) Assignee: SANDISK Technologies LLC, Plano, TX (US)

( * ) Notice: Subject to any disclaimer, the term of this patent is extended or adjusted under 35 U.S.C. 154(b) by 0 days. days.

(21) Appl. No.: 15/264,860

(22) Filed: Sep. 14, 2016

(65) Prior Publication Data

US 2017/0004052 A1 Jan. 5, 2017

Related U.S. Application Data

(63) Continuation of application No. 13/795,470, filed on Mar. 12, 2013, now Pat. No. 9,471,419.

(51) Int. Cl.
| | |
|---|---|
| G06F 11/14 | (2006.01) |
| G06F 12/128 | (2016.01) |
| G06F 11/10 | (2006.01) |
| G06F 12/0875 | (2016.01) |
| G06F 11/16 | (2006.01) |

(52) U.S. Cl.
CPC ........ *G06F 11/1469* (2013.01); *G06F 11/108* (2013.01); *G06F 11/1068* (2013.01); *G06F 11/1451* (2013.01); *G06F 11/16* (2013.01); *G06F 12/0875* (2013.01); *G06F 12/128* (2013.01); *G06F 2201/805* (2013.01); *G06F 2201/82* (2013.01); *G06F 2201/84* (2013.01); *G06F 2212/222* (2013.01)

(58) Field of Classification Search
CPC ............. G06F 11/1068; G06F 11/1008; G06F 11/1048; G06F 11/108; G06F 11/1044; G06F 11/1016; G06F 11/1004; G06F 11/1012
See application file for complete search history.

(56) References Cited

U.S. PATENT DOCUMENTS

| | | |
|---|---|---|
| 5,831,988 A | 11/1998 | Fagerness |
| 6,011,734 A | 1/2000 | Pappert |

(Continued)

OTHER PUBLICATIONS

Office Action issued in corresponding U.S. Appl. No. 13/795,470 dated Aug. 13, 2015, 11 pgs.

(Continued)

*Primary Examiner* — Reginald G Bragdon
*Assistant Examiner* — Thanh D Vo
(74) *Attorney, Agent, or Firm* — Brinks Gilson & Lione

(57) ABSTRACT

Systems and methods for performing data recovery are disclosed. A controller of a memory system may detect an error at a first page of memory and identify a data keep cache associated with the first page, the data keep cache associated with a primary XOR sum. The controller may further sense data stored at a second page and move the data to a first latch of the memory; sense data stored at a third page such that the data is present in a second latch of the memory; and calculate a restoration XOR sum based on the data of the second page and the data of the third page. The controller may further calculate the data of the first page based on the primary XOR sum and the restoration XOR sum, and restore the data of the first page.

16 Claims, 11 Drawing Sheets

(56) References Cited

U.S. PATENT DOCUMENTS

| | | |
|---|---|---|
| 6,259,639 B1 | 7/2001 | Hashizume |
| 6,928,598 B1 | 8/2005 | Agrawal et al. |
| 2003/0101405 A1 | 5/2003 | Shibata |
| 2013/0173956 A1 | 7/2013 | Anderson |

OTHER PUBLICATIONS

Office Action issued in corresponding U.S. Appl. No. 13/795,470 dated Mar. 8, 2016, 12 pgs.
Notice of Allowance issued in corresponding U.S. Appl. No. 13/795,470 dated Jun. 15, 2016, 5 pgs.

SYSTEMS AND METHODS FOR PERFORMING DATA RECOVERY IN A MEMORY SYSTEM

RELATED APPLICATIONS

The present application is a continuation of U.S. patent application Ser. No. 13/795,470 (still pending), filed Mar. 12, 2013, the entirety of which is hereby incorporated by reference.

The present application is related to U.S. patent application Ser. No. 13/795,460 (now U.S. Pat. No. 9,183,081), filed Mar. 12, 2013, the entirety of which is hereby incorporated by reference.

BACKGROUND

Traditionally, manufacturers test memory within memory systems at the time of manufacture in order to detect defects within the memory. One way in which manufacturers test memory for defects is to subject the memory to a number of operations in order to bring out defects in the memory. For example, causing significant stress in a memory may result in errors becoming evident such as a strong or weak control gate substrate short ("CGSS"), a wordline-to-wordline short, and/or a broken wordline within the memory of the storage system.

While the above-described procedure may allow manufacturers to detect defects within the memory, applying enough stress to the memory in order to bring out the defects may cause the memory to become vulnerable to more failures causing a loss of memory yield. Therefore, improved systems and methods for detecting defects within a memory and recovering data after detecting the defect in the memory that do not reduce an overall memory yield are desirable.

SUMMARY

The present disclosure is directed to systems and methods for performing data recovery in a memory system. In one aspect, a method for performing data recovery is disclosed. The elements of the method occur in a controller of a memory system coupled to a host device. The controller detects an error at a first page of a memory of the memory system; identifies a data keep cache that is associated with the first page, the data keep cache associated with a primary XOR sum; and identifying a plurality of pages of memory other than the first page that are associated with the data keep cache.

The controller senses data stored at a second page of memory of the plurality of pages of memory and moves the data of the second page to a first latch of the memory. The controller further senses data stored at a third page of the memory of the plurality of pages of memory such that the data of the third page of memory is present in a second latch of the memory, and calculates a restoration XOR sum based on the data of the second page of the memory present at the first latch of memory and the data of the third page of the memory present at the second latch of memory.

The controller further moves the restoration XOR sum to a third latch of memory; calculates the data of the first page of memory based on the primary XOR sum and the restoration XOR sum; and restores the data of the first page of memory based on the calculation of the data of the first page.

In another aspect, a memory system including a non-volatile memory and a processor in communication with the non-volatile memory is disclosed. The processor is configured to detect an error at a first page of the non-volatile memory; identify a data keep cache that is associated with the first page of the non-volatile memory, the Data keep cache associated with a primary XOR sum; and identify a plurality of pages of the non-volatile memory other than the first page of the non-volatile memory that are associated with the data keep cache;

The processor is further configured to sense data stored at a second page of the non-volatile memory of the plurality of pages of the non-volatile memory and move the data of the second page of the non-volatile memory to a first latch of the non-volatile memory; sense data stored at a third page of the non-volatile memory of the plurality of pages of the non-volatile memory such that the data of the third page of the non-volatile memory is present in a second latch of the non-volatile memory; and calculate a restoration XOR sum based on the data of the second page of the non-volatile memory present at the first latch of the non-volatile memory and the data of the third page of the non-volatile memory present at the second latch of the non-volatile memory.

The processor is also configured to move the restoration XOR sum to a third latch of the non-volatile memory; calculate the data of the first page of the non-volatile memory based on the primary XOR sum and the restoration XOR sum; and restore the data of the first page of non-volatile memory based on the calculation of the data of the first page.

In yet another aspect, another method for performing data recovery is disclosed. The elements of the method occur in a controller of a memory system coupled with a host, the memory system comprising a memory divided into a plurality of die, each die of the plurality of die divided into two or more planes, and each plane of the two or more planes divided into a plurality of pages.

The controller calculates a primary XOR sum across data stored in the plurality of die of the memory, and, for each die of the plurality of die, for each plane of the die, calculates a plane XOR sum of the plane for the data stored within the pages of the specific plane. The controller further identifies an error in a first page, the first page positioned in a first plane of the two or more planes of a first die of the plurality of dies of the memory.

The controller further calculates, in response to identifying the error, data to be stored at the first page based on the primary XOR sum, the plane XOR sum of each plane of each die other than the first die of the plurality of die, the plane XOR sum of each plane of the first die other than the first plane, and an XOR sum of each page of the first plane of the first die other than the first page. The controller restores the data of the first page based on the calculation of the data to be stored at the first memory page.

In a further aspect, another memory system is disclosed. The memory system may include a non-volatile memory and a processor in communication with the non-volatile memory. The non-volatile memory comprises a plurality of latches, the non-volatile memory divided into a plurality of die, each die of the plurality of die divided into two or more planes, and each plane of the two or more planes divided into a plurality of pages.

The processor is configured to calculate a primary XOR sum across data stored in the plurality of die of the non-volatile memory, and, for each die of the plurality of die, for each plane of the die, calculate a plane XOR sum of the plane for the data stored within the pages of the specific plane. The controller is further configured to identify an error in a first page, the first page positioned in a first plane of the two or more planes of a first die of the plurality of dies of the non-volatile memory; calculate, in response to identifying the error, data to be stored at the first page based on the primary XOR sum, the plane XOR sum of each plane of each die other than the first die of the plurality of die, the plane XOR sum of each plane of the first die other than the first plane, and a restoration XOR sum of each page of the first plane of the first die other than the first page; and restore the data of the first page based on the calculation of the data to be stored at the first page.

DETAILED DESCRIPTION OF THE DRAWINGS

The present disclosure is directed to systems and methods for performing data recovery in a memory system after identifying an error in the memory. As explained in more detail below, a controller may utilize a system cache, such as a Flash Management Unit Tag cache ("Tag cache"), and a plurality of data keep caches to store information as the controller performs data write operations. When an error is detected at a physical location of the memory such as a page of memory, the controller may reconstruct and restore data to the page of memory where the error occurred using the Tag cache and the plurality of data keep caches.

Generally, in order to increase performance of data recovery operations, a controller of a memory system may store XOR sums of various groups of memory, such as XOR sums for die of memory or XOR sums for planes of a die of memory, to reduce a number of operations that the controller must perform during data recovery operations. Additionally, the controller may utilize one or more latches of a memory of the memory system when calculating XOR sums to further reduce a number of operations that the controller must perform during data recovery operations.

Figure 1:
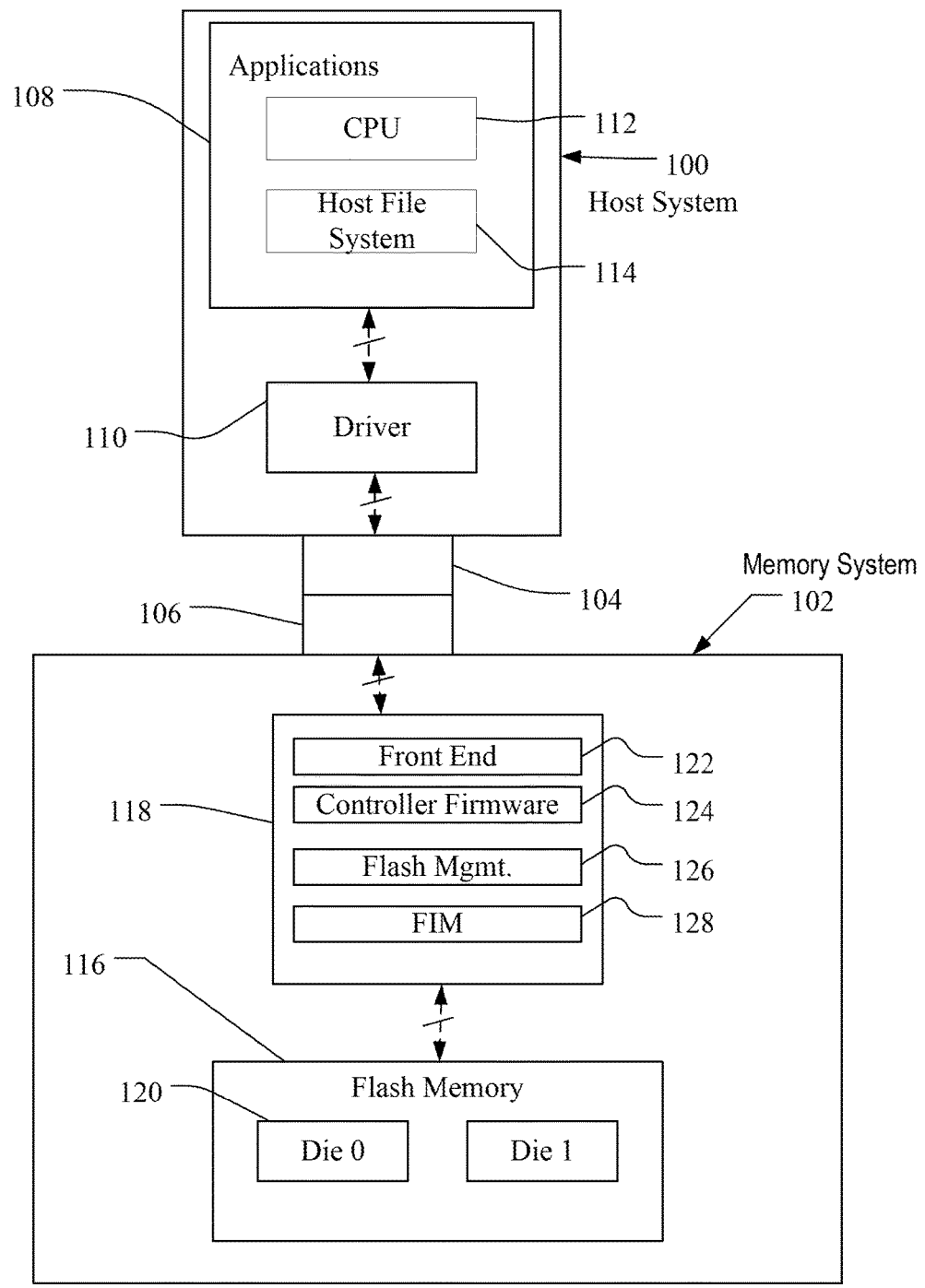
FIG. 1 illustrates a host connected with a memory system having a multi-bank non-volatile memory containing multiple die that may implement the disclosed methods for performing data recovery in a memory system after identifying an error in the memory.

A flash memory system suitable for use in implementing aspects of the invention is shown in FIGS. 1-6. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

The host system 100 of FIG. 1 may be viewed as having two major parts, in so far as the memory system 102 is concerned, made up of a combination of circuitry and software. They are an applications portion 108 and a driver portion 110 that interfaces with the memory system 102. In a PC, for example, the applications portion 108 can include a processor 112 running word processing, graphics, control or other popular application software, as well as the file system 114 for managing data on the host 100. In a camera, cellular telephone or other host system that is primarily dedicated to perform a single set of functions, the applications portion 108 includes the software that operates the camera to take and store pictures, the cellular telephone to make and receive calls, and the like.

The memory system 102 of FIG. 1 may include non-volatile memory, such as flash memory 116; a system controller 118 that both interfaces with the host 100 to which the memory system 102 is connected for passing data back and forth and controls the memory 116; and one or more data buffers 119 coupled with the system controller 118 that the system controller 118 utilizes to buffer data before storing the data to the flash memory 116. The system controller 118 may convert between logical addresses of data used by the host 100 and physical addresses of the flash memory 116 during data programming and reading. The flash memory 116 may include any number of memory die 120 and two memory die are shown in FIG. 1 simply by way of illustration.

Functionally, the system controller 118 may include a front end 122 that interfaces with the host system, controller logic 124 for coordinating operation of the memory 116, flash management logic 126 for internal memory management operations such as garbage collection, and one or more flash interface modules (FIMs) 128 to provide a communication interface between the controller with the flash memory 116.

Figure 2:
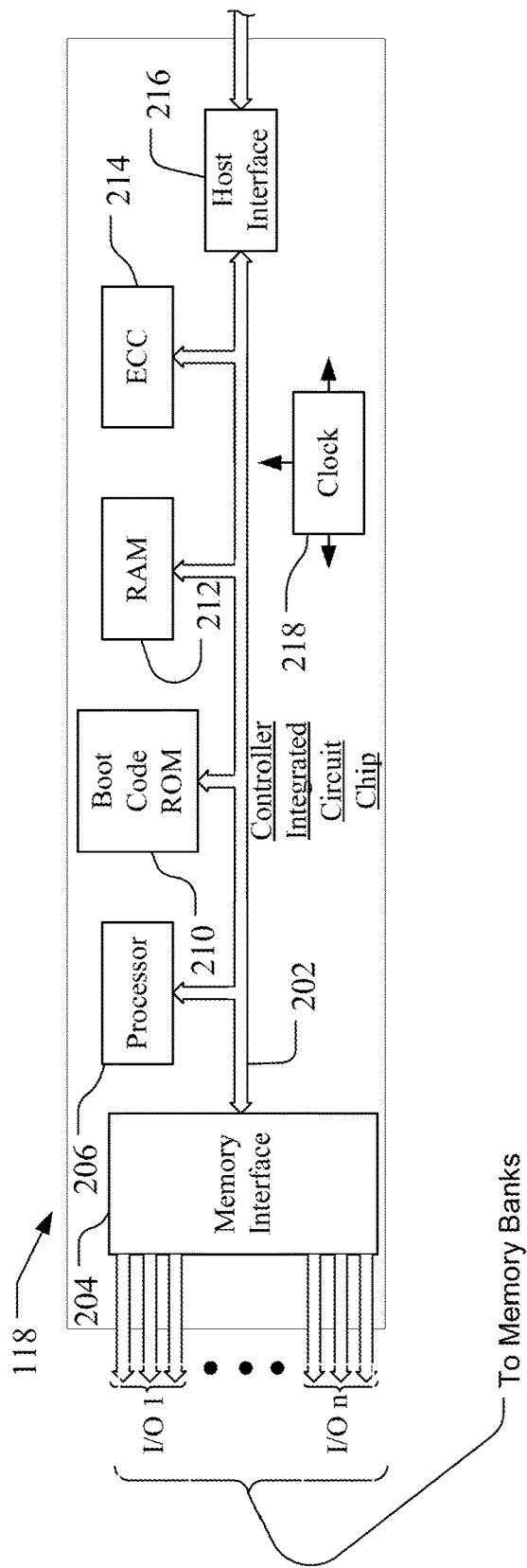
FIG. 2 is an example block diagram of an example flash memory system controller for use in the multiple die non-volatile memory of FIG. 1.

The system controller 118 may be implemented on a single integrated circuit chip, such as an application specific integrated circuit (ASIC) such as shown in FIG. 2. The processor 206 of the system controller 118 may be configured as a multi-thread processor capable of communicating separately with each of the respective memory banks 120 via a memory interface 204 having I/O ports for each of the respective banks 120 in the flash memory 116. The system controller 118 may include an internal clock 218. The processor 206 communicates with an error correction code (ECC) module 214, a RAM buffer 212, a host interface 216, and boot code ROM 210 via an internal data bus 202.

Figure 3:
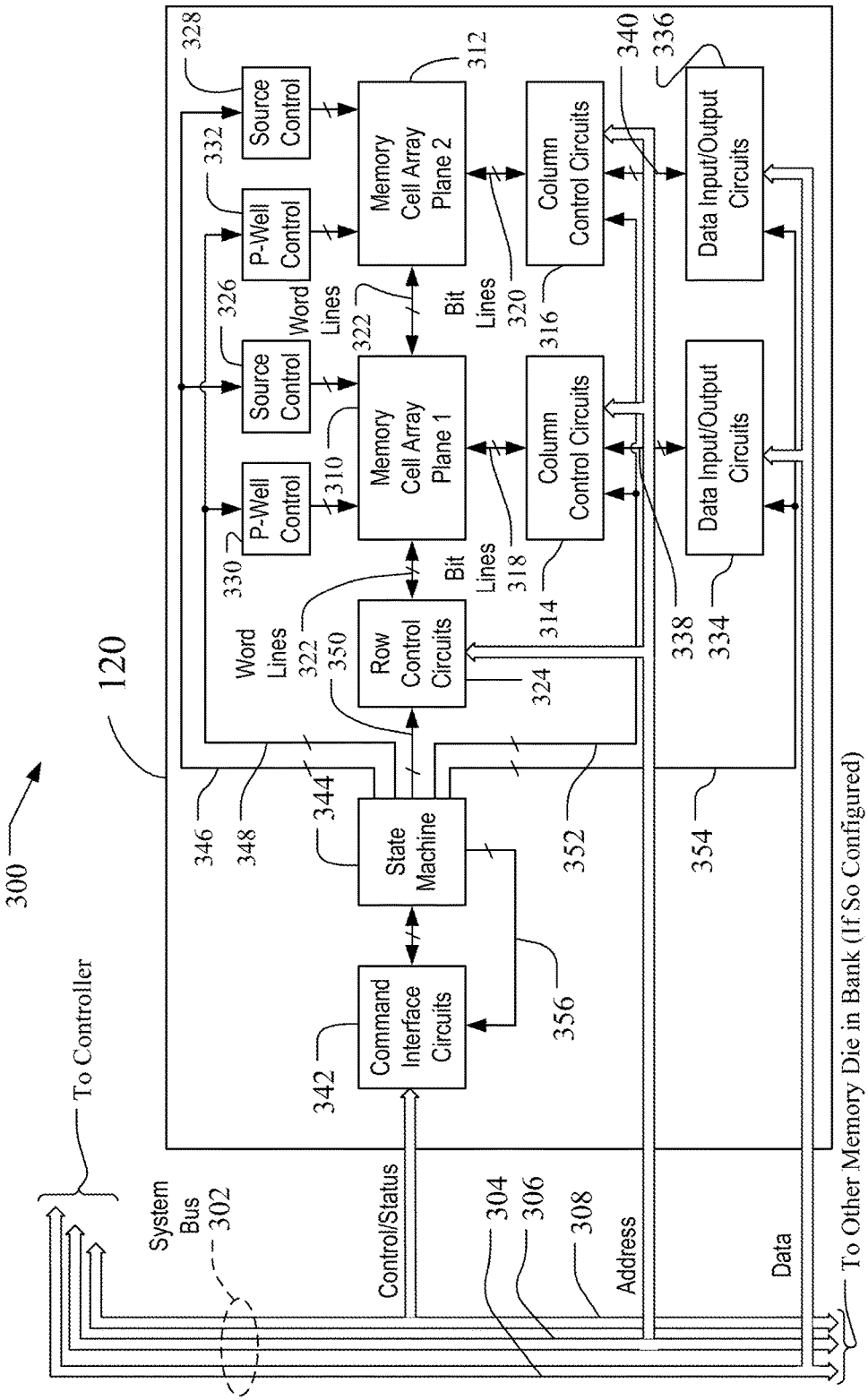
FIG. 3 is an example one flash memory bank suitable as one of the non-volatile memory banks illustrated in FIG. 1.

Each die 120 in the flash memory 116 may contain an array of memory cells organized into multiple planes. FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 306. Source voltage control circuits 326 and 328 are also connected with the respective planes, as are p-well voltage control circuits 330 and 332. If the bank 300 is in the form of a memory chip with a single array of memory cells, and if two or more such chips exist in the system, data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each bank 120 to program data, read data, erase and attend to various housekeeping matters, each memory chip also contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other architectures, such as NOR, can be used instead. An example NAND array is illustrated by the circuit diagram of FIG. 4a, which is a portion of the memory cell array 310 of the memory bank 300 of FIG. 3. A large number of global bit lines are provided, only four such lines 402-408 being shown in FIG. 4a for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4A:
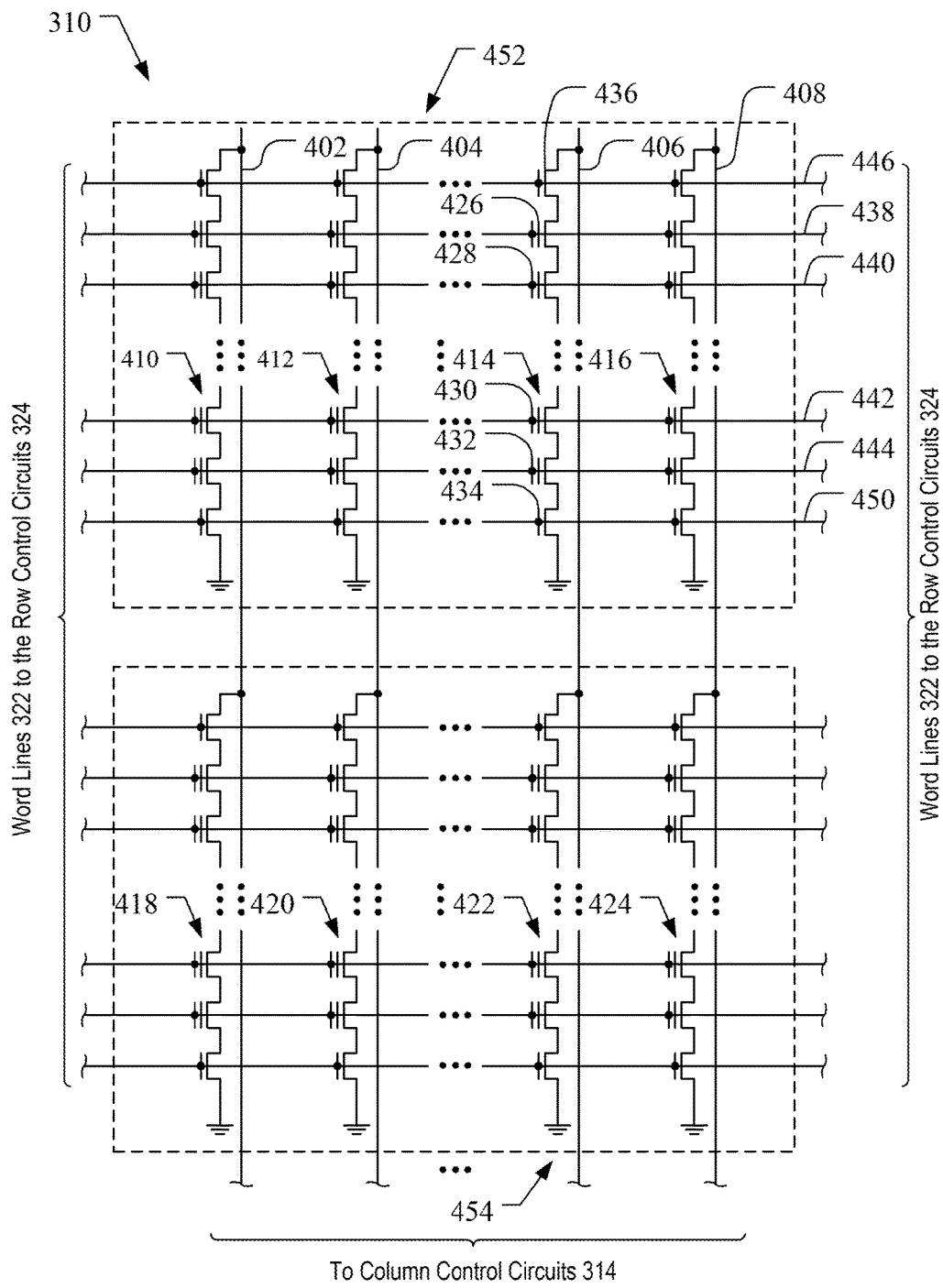
FIG. 4a is a representative circuit diagram of a memory cell array that may be used in the memory bank of FIG. 3.

Word lines 438-444 of FIG. 4a individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. However, in other implementations, the rows of a NAND array are not programmed in sequential order for reasons such as reducing coupled between adjacent word lines.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Figure 4B:
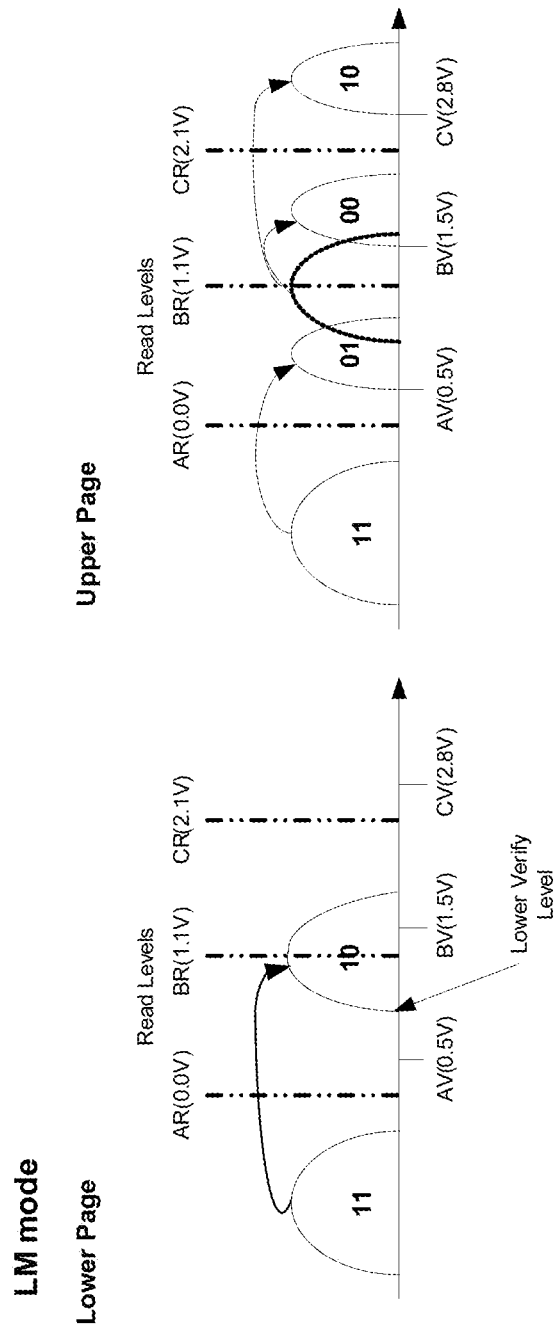
FIG. 4b illustrates charge levels in a MLC memory operated to store two bits of data in a memory cell.

FIG. 4b illustrates one implementation of the four charge levels used to represent two bits of data in a memory cell. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page.

For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

Figure 5:
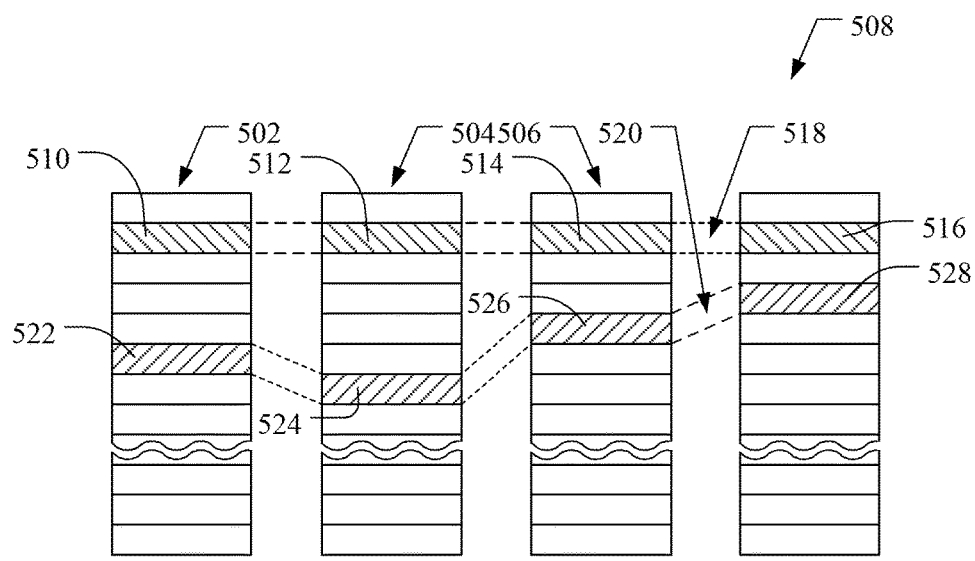
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
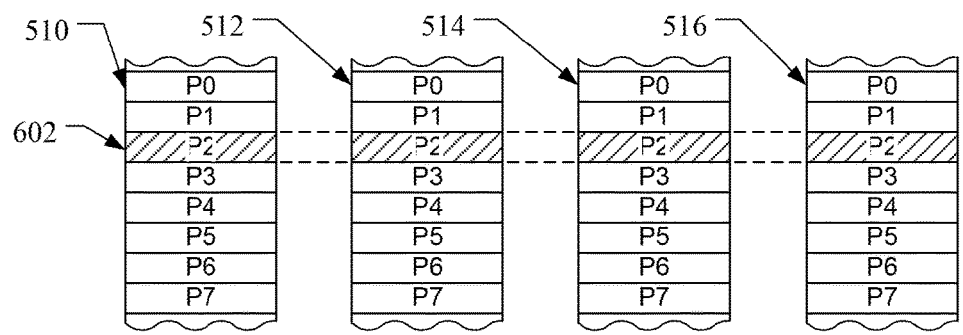
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks.

The flash management layer in the controller firmware of the memory card may choose to allocate memory in terms of allocation units called logical groups. Writes that are less than a logical group size will result in the controller copying valid data stored at an original physical location to a new physical location in addition to the controller writing incoming data. This overhead decreases performance and endurance of the memory. In order to minimize this overhead, a group of memory is used as update blocks. An update block is usually a memory of better endurance than the data blocks. i.e, if the data blocks have MLC memory, the update blocks have SLC memory. Writes that are less than a logical group may result in the controller directing data into the update blocks, and after consolidation, the controller may copy data at a later point in time from the update block to one or more program data blocks. The controller performs these actions based on the fact that the update blocks are more durable and there is more possibility of collecting the entire logical group of data in the update blocks before writing into the data blocks, thus reducing overhead in the MLC memory. It is also more desirable to retain frequently written data blocks in the update block for similar reasons.

As mentioned above, systems and methods may provide, in order to perform data recovery operations, a controller of a memory system may utilize a system cache, such as a Rash Management Unit Tag cache ("Tag cache"), and a plurality of data keep caches to store information as the controller performs data write operations. The Tag cache and the data keep caches are typically present in the controller RAM. In some implementations, the sizes of the Tag cache and/or the data keep caches are static. In other implementations, a controller may dynamically adjust a size of one or more of the Tag cache and/or the data keep caches based on a number of open data blocks in the memory system.

Generally, as the controller performs data writes to a memory of the memory system, the controller will store physical locations of the memory associated with the data writes in the Tag cache. Additionally, the controller will store at least one XOR sum in a data keep cache whose value is calculated across the data stored at the physical locations of the memory present in the Tag cache. In some implementations this may be known as a primary XOR sum.

The controller may further store one or more other XOR sums in data keep caches whose value is calculated across the data stored at the physical locations of a particular grouping of the memory. For example, the controller may store a secondary XOR sum across the data stored at physical locations of a die of memory, an XOR sum across the data stored at physical locations of a specific plane of a die of the memory, and/or any other grouping of the memory as desired by the controller. In some implementations, these secondary XOR sums may be known as a die XOR sum or a plane XOR sum.

When the memory system detects an error at physical location of the memory, the controller utilizes the primary XOR sum whose value is calculated across the data stored at the physical locations of the memory present in the Tag cache to recalculate the data that should be stored at the physical location wherein the error occurred.

As explained in more detail below, in some implementations the controller utilizes one or more latches of the memory system during the data recovery operations to temporarily store data. Those of skill in the art will appreciate that latches of the memory system may be internal NAND memory buffers that are present in every plane of the memory and are typically equal in size to a physical page. By temporarily storing data in one or more latches of memory while performing XOR operations rather than toggling data out from the physical locations in the memory, there is significant timesavings in the toggle time operations that are performed in recovering data. An internal transfer time between latches is considerably less as compared to transfer times from the memory to the controller.

Figure 7A:
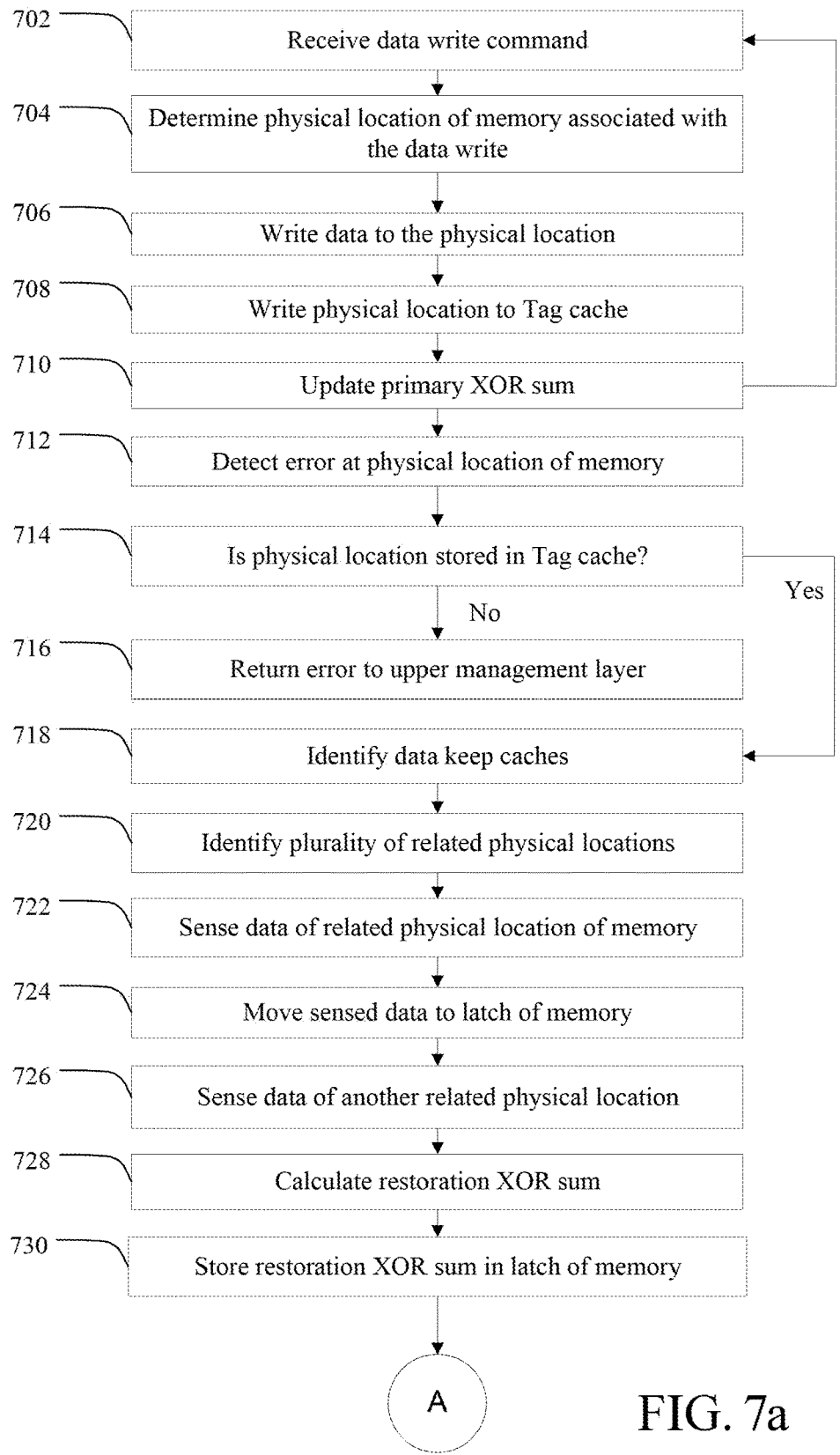
FIGS. 7a and 7b are a flow chart of one method for performing data recovery in a memory system.
Figure 7B:
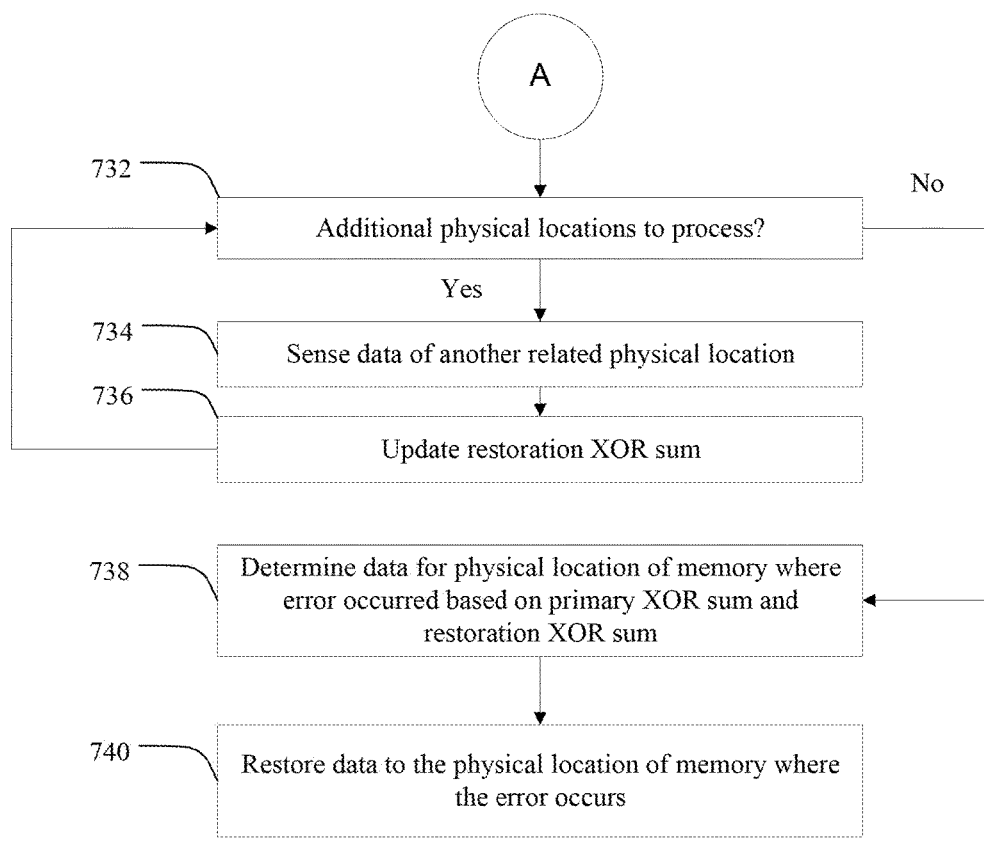

FIGS. 7*a* and 7*b* are a flow chart of one method for performing data recovery in a memory system that utilizes latches of a memory to reduce a number of operations that a controller must perform during data recovery. In some implementations, the elements of the method described in FIGS. 7*a* and 7*b* occur in a controller of a memory system that is coupled to a host device. However, in other implementations, the controller is located on the host device or the controller is divided between the memory system and the host device.

The method begins at step 702 with a controller receiving a command to write data in a non-volatile memory of the memory system, such as flash memory. It will be appreciated that the controller may receive the command to write data to the memory from the host system or the controller may initiate the command to write data to the memory on its own.

At step 704, the controller identifies a physical location of the memory, such as one or more pages of memory, associated with the data write. At step 706, the controller executes the data write to store data associated with the data write to the identified physical location. At step 708, the controller stores the physical location associated with the data write in a Tag cache.

At step 710, the controller updates a primary XOR sum stored in a data keep cache whose value is calculated across the data stored at the physical locations of the memory stored in the Tag cache. The controller updates the primary XOR sum based on the data associated with the data write and a value of the primary XOR sum before the update.

It will be appreciated that the controller loops to step 702 and continues to execute data writes and store information associated with the data writes until at step 712, the controller or another module within the memory system detects an error at a physical location the memory. In some implementations, the controller or another module within the memory detects an error at a specific page of the memory. The error may be an EPD failure detected using techniques known by those of skill in the art, a read failure, or any other type of error that may require data recovery.

At step 714, the controller determines whether the physical location where the error occurs is stored in the Tag cache. If the controller determines that the physical location where the error occurs is not in the Tag cache, the controller may return an error to an upper management layer of the memory system and/or host device at step 716.

However, when the controller determines at step 714 that the physical location where the error occurs is in the Tag cache, at step 718, the controller identifies one or more data keep caches storing an XOR sum that is associated with the physical location where the error occurs. In the presently described implementation, the controller identifies one data cache storing the primary XOR sum whose value is calculated across the data stored at the physical locations of the memory stored in the Tag cache. However, in other implementations, such as those described below in conjunction with FIGS. 8, 9, and 10, the controller may identify multiple data keep caches, where the multiple data keep caches includes one or more data keep caches storing a secondary XOR sum, such as a die XOR sum or a plane XOR sum, that is associated with the physical location where the error occurs.

At step 720, the controller identifies a plurality of related physical locations of the memory, where the plurality of related physical locations of memory include physical locations of memory, other than the physical location of the memory where the error occurs, that are associated with the identified data keep caches. For example, the plurality of related physical locations of memory may include physical locations of memory stored in the Tag cache whose value were used to calculate the primary XOR sum.

At step 722, the controller senses a physical location of the memory of the plurality of related physical locations of memory, and at step 724, the controller moves the data of the sensed physical location to a first latch of the memory. At step 726, the controller senses another physical location of the plurality of related physical locations such that the data of the physical location of the memory is present in a second latch of the memory.

At step 728, the controller calculates a restoration XOR sum based on the data of the physical location of memory present at the first latch of the memory and the data of the physical location of memory present at the second latch of the memory.

At step 730, the controller stores the restoration XOR sum to a latch of memory. In some implementations, the controller stores the restoration XOR sum to a new third latch of memory. However, it will be appreciated that the controller may store the restoration XOR sum in any latch of memory such as the first or second latch of memory.

At step 732, the controller determines whether additional physical locations of the plurality of related physical locations need to be processed. If the controller determines that additional physical locations should be processed, at step 734, the controller senses another physical location of the plurality of related physical locations such that data of the physical location of the memory is present in a latch of the memory. In some implementations, the controller senses the physical location of the memory such that the data of the physical location of the memory is present in a new fourth latch of memory. However, it will be appreciated that the controller may sense the data of the physical location of the memory such that the data is present in any latch of memory other than the latch of memory storing the restoration XOR sum.

At step 736, the controller updates the restoration XOR sum based on value of the restoration XOR sum present in a latch of the memory and the value of the physical location of the memory sensed at step 734. The controller updates the restoration XOR sum such that the resulting restoration XOR sum is present in a latch of the memory. The updated restoration XOR sum may be present in the latch that stored the previous restoration XOR sum or any other latch of the memory. The method then proceeds to step 732 and the controller repeats the above-described process for each additional physical location of memory of the plurality of related physical locations of memory such that the restoration XOR sum is calculated based on each physical location associated with the primary XOR sum other than the physical location where the error occurs.

Referring again to step 732, if the controller determines that all the physical locations of the plurality of related physical locations have been processed, at step 738 the controller determines the data for the physical location of memory where the error occurred based on the primary XOR sum and the restoration XOR sum. In some implementations, the data for the physical location of memory where the error occurred may be calculated using an XOR algorithm as known to those of skill in the art. At step 740, the controller restores the data to the physical location of the memory where the error occurs.

In the process described above in conjunction with FIG. 7, the controller senses each physical location of the plurality of related physical locations in order to calculate the restoration XOR sum. In other implementations, the controller may store one or more secondary XOR sums so that the controller must only sense a subset of the physical locations of the plurality of related physical location of memory. For example, the controller may store a secondary XOR sum such as a die XOR sum for one or more die of the memory, a secondary XOR sum such as a plane XOR sum for one or more planes of a die, or any other grouping of physical locations of the memory.

Figure 8:
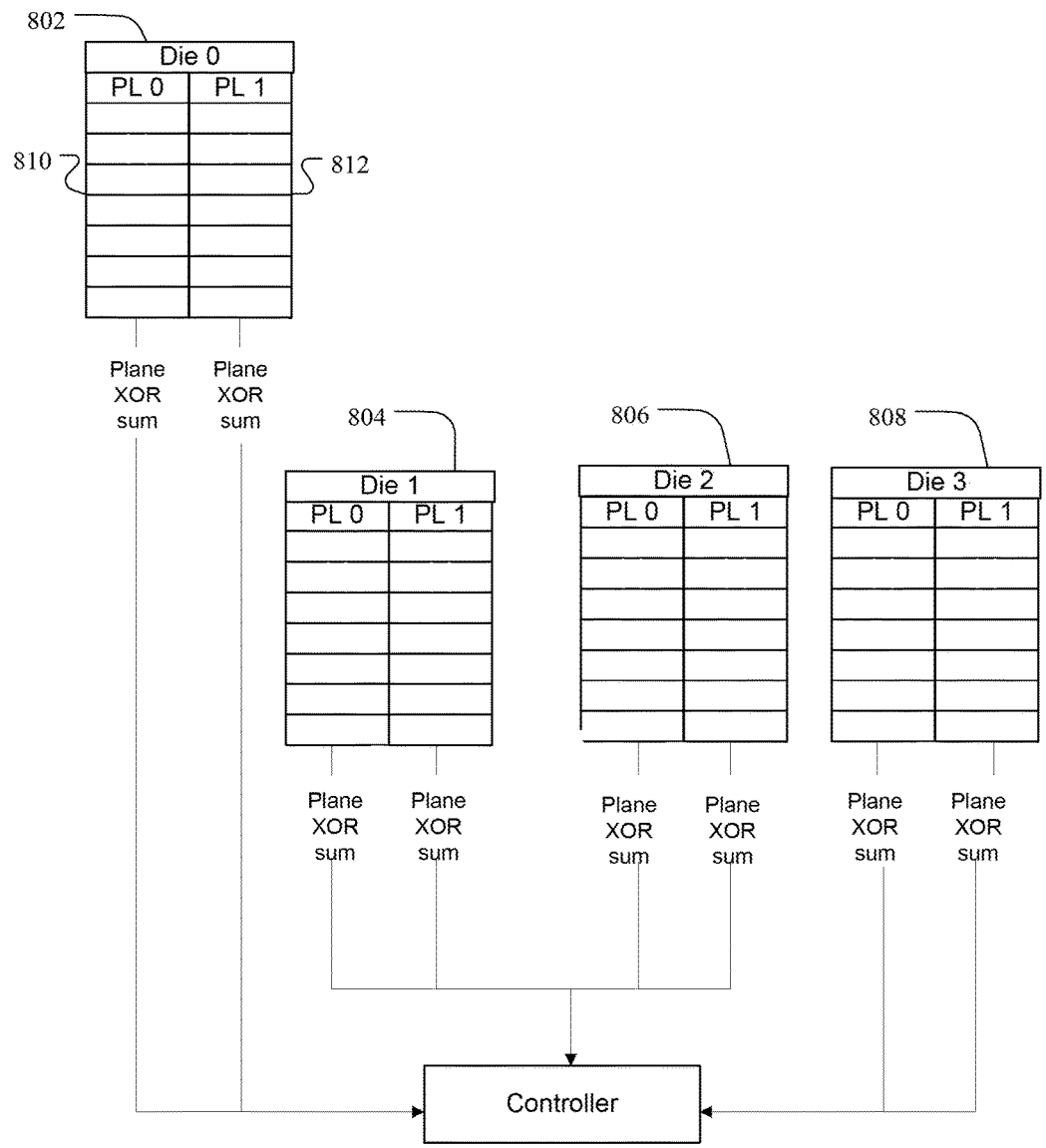
FIG. 8 is a diagram illustrating one method for utilizing secondary XOR sums, such as plane XOR sums, for groupings of physical locations of memory within a memory system.

FIG. 8 is a diagram illustrating one method for utilizing secondary XOR sums for groupings of physical locations of memory within a memory system. In this illustrative example, a memory may include a first die 802, a second die

804, a third die 806, and a fourth die 808. Additionally, each of the die 802, 804, 806, 808 may include a first plane 810 and a second plane 812.

As the controller executes data writes, the controller may calculate secondary XOR sums such as plane XOR sums for each plane. Continuing with the example of FIG. 8, for the first die 802, as the controller processes data writes to the first die, the controller may calculate a plane XOR sum for the first plane 810 of the first die 802 and a plane XOR sum for the second plane 812 of the first die 802. The controller may calculate additional plane XOR sums for each plane of the second die 804, third die 806, and fourth die 808.

When an error occurs in a page of one of the planes of one of the die, when calculating a restoration XOR sum, the controller may utilize the previously calculated plane XOR sums rather sensing each page of memory in the planes where the error did not occur. For example, if the controller determines an error occurs at a page of the first plane 810 of the third die 806, the controller may sense each page of the first plane 810 of the third die 806 in calculating a restoration XOR sum. However, rather than sensing each physical location of the second plane 812 of the third die, or sensing each physical location of any of the planes of the first die 802, the second die 804, or the fourth die 808, the controller may utilize the previously-calculated plane XOR sums in calculating the restoration XOR sum.

It will be appreciated that while the process of utilizing secondary XOR sums may require the controller to perform additional operations while executing write data commands, the secondary XOR sums allow the controller to restore data more quickly after an error is detected in the memory system.

Figure 9:
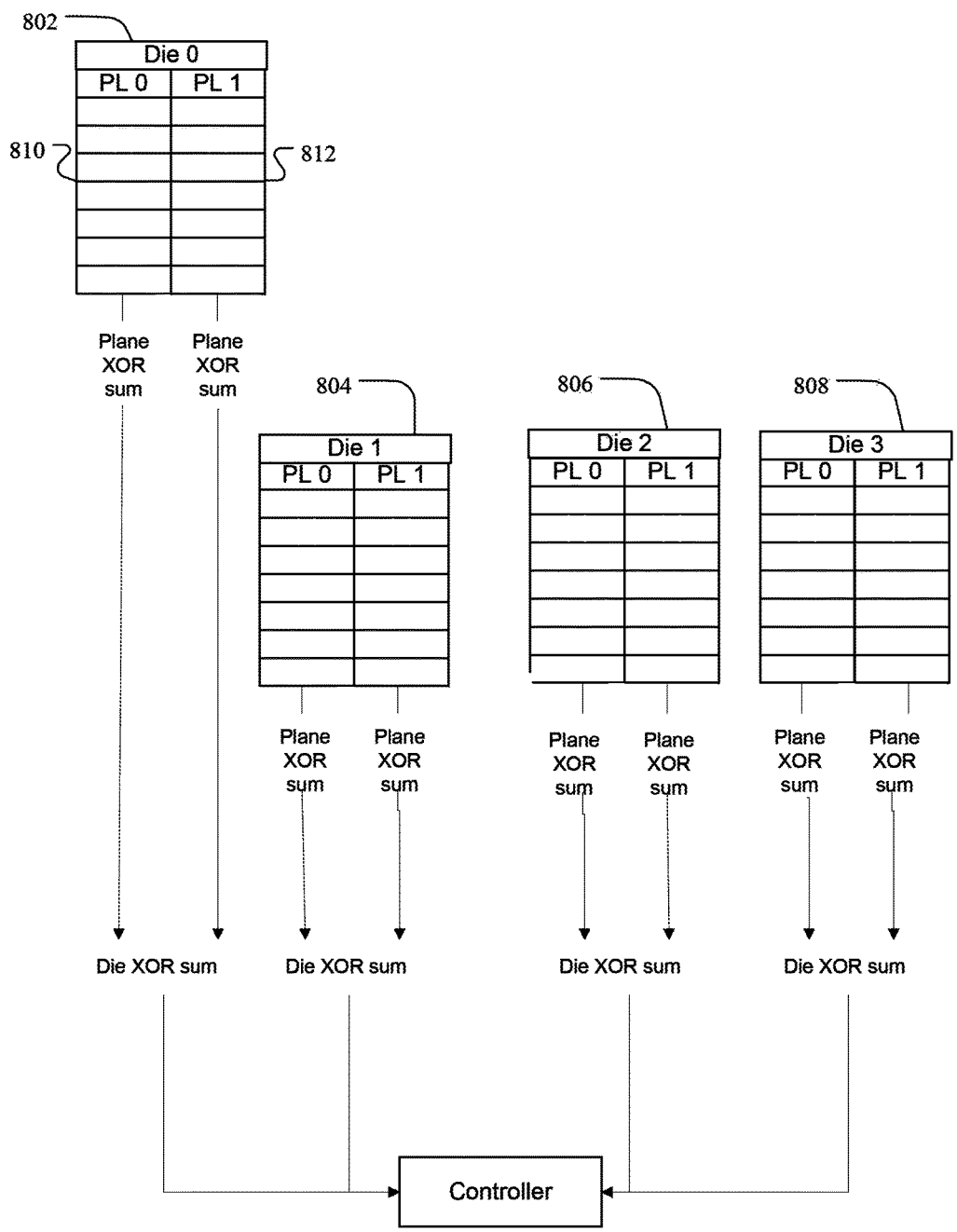
FIG. 9 is a diagram illustrating another method for utilizing secondary XOR sums, such as die XOR sums and plane XOR sums, for groupings of physical locations of memory within a memory system.

FIG. 9 is a diagram illustrating another method for utilizing secondary XOR sums for groupings of physical locations of memory within a memory system. In this illustrative example, in addition to plane XOR sums for each plane of a die of the memory, the controller additionally stores secondary XOR sums such as plane XOR sums for each of the die 802, 804, 806, 808. Therefore, when an error occurs in a page of one of the die, when calculating a restoration XOR sum, the controller may utilize the previously-calculated plane XOR sum for each die where the error did not occur, and within the die where the error occurred, utilize the previously-calculated plane XOR sum for each plane of the de where the error did not occur.

Continuing with the example above, if the controller determines an error occurs at a page of the first plane 810 of the third die 806, the controller may sense each page of the first plane 810 of the third die 806 in calculating the restoration XOR sum. However, rather than sensing each physical location of the second plane 812 of the third die 806, or sensing physical locations within the first die 802, the second die 804, or the fourth die 808, the controller may utilize the previously-calculated plane XOR sum for the second plane 812 of the third die 806 and the previously-calculated die XOR sums for the first die 802, the second die 804, and the fourth die 808.

Figure 10:
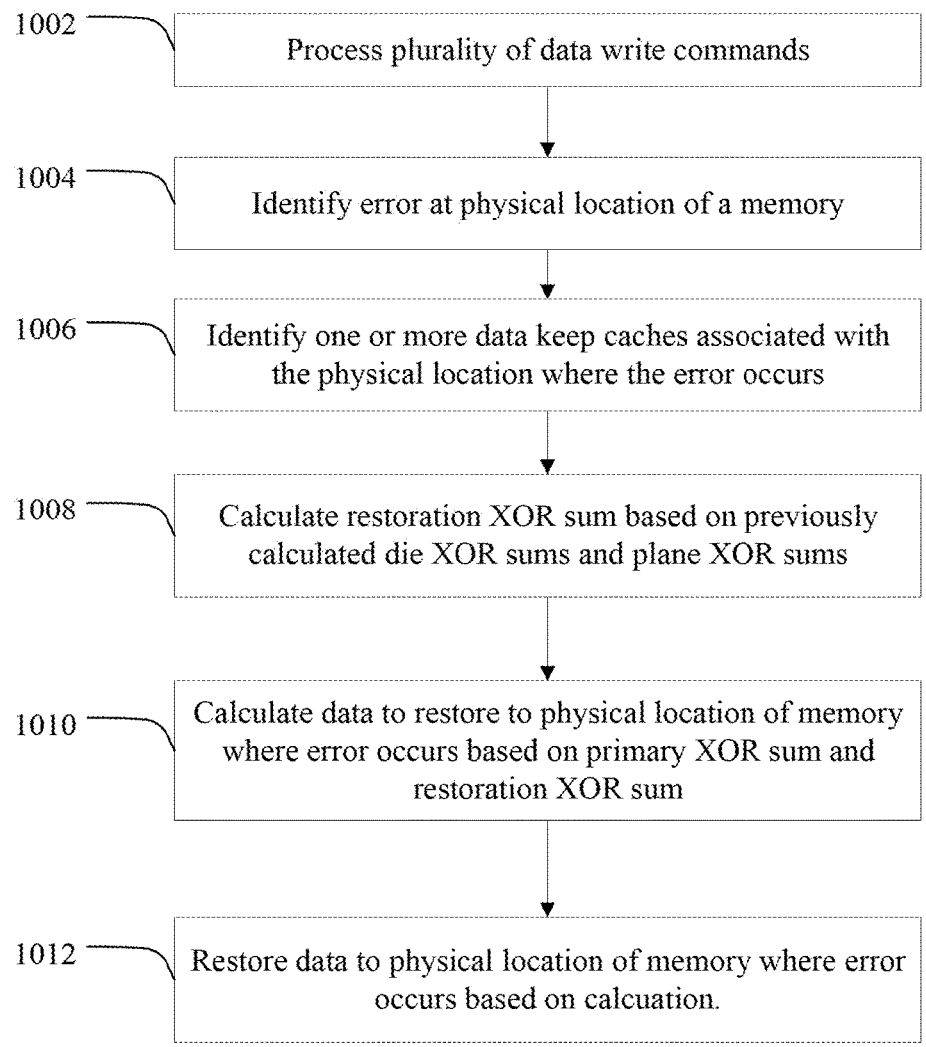
FIG. 10 is a flow chart of one method for performing data recovery in a memory system utilizing secondary XOR sums such as die XOR sums and plane XOR sums.

FIG. 10 is a flow chart of a method for performing data recovery in a memory system utilizing secondary XOR sums, such as die XOR sums and plane XOR sums, in addition to a primary XOR sum and a restoration XOR sum. It should be appreciated that the method described in conjunction with FIG. 10 is similar to the method described above in conjunction with FIG. 7, and that a description of similar actions performed by the controller may not be repeated below.

In some implementations, the elements of the method occur in a controller of a memory system coupled with a host, where the memory system includes a non-volatile memory divided into a plurality of die, each die of the plurality of die divided into two or more planes, and each plane of the two or more planes dived into a plurality of pages. However, in other implementations, the controller is located on the host device or the controller is divided between the memory system and the host device.

The method begins at step 1002 with the controller processing a plurality of data write commands. It will be appreciated that the controller may processes data write commands similar to as described above to store data associated with data writes in physical locations of the memory and store the physical locations of the memory in a Tag cache.

Additionally, as part of processing the data write commands, the controller may store XOR sums in a plurality of data keep caches. For example, the controller may calculate a primary XOR sum across data stored in the plurality of memory locations stored in the Tag cache. Further, the controller may calculate, for one or more die of the memory, for each plane of the die, a plane XOR sum of the plane for the data stored within the pages of the plane. Similarly, the controller may calculate, for one or more die of the memory, a die XOR sum of the die for the data stored within the pages of the plane of the die.

At step 1004, the controller or another module in the memory system identifies an error at a physical location of the memory, such as a page of the memory positioned in a plane of a die of the memory.

In response to detecting the error, at step 1006, the controller identifies one or more data keep caches storing an XOR sum that is associated with the physical location where the error occurs. For example, in memory systems utilizing secondary XOR sums for planes and die as discussed above in conjunction with FIG. 9, the controller may identify a data keep cache storing a primary XOR sum and one or more data keeps caches storing secondary XOR sums related to planes and/or die of the memory.

At step 1008, the controller calculates a restoration XOR sum. As discussed above, the controller may calculate the restoration XOR sum by sensing physical locations of the memory within the plane of the die where the error occurs and utilizing die XOR sums associated with die other than the die where the error occurs, and plane XOR sums associated with planes of the die where the error occurs other than the plane that the error occurs in.

At step 1010, the controller calculates the data to be stored at the physical location where the error occurs based on the primary XOR sum and the restoration XOR sum. At 1012, the controller restores the data to the physical location where the error occurs.

FIGS. 1-10 illustrate systems and methods for performing data recovery in a memory system. As explained above, a controller may perform data recovery in a memory system after identifying a defect in the memory. The controller may utilize a system cache, such as a Tag cache, and a plurality of data keep caches to store information as the controller performs data write operations. When an error is detected at a physical location of a memory, such as a page of memory, the controller may reconstruct and restore data to the page of memory where the error occurred using the Tag cache and XOR sums such as a primary XOR sum, secondary XOR sums, and a restoration XOR sum that are stored in the plurality of data keep caches.

In order to increase performance of data recovery operations, a controller of a memory system may store XOR sums of various groups of memory, such as die XOR sums for die of memory or plane XOR sums for planes of a die of memory, to reduce a number of operations that the controller must perform during data recovery operations. Additionally, the controller may utilize one or more latches of a memory of the memory system when calculating XOR sums to further reduce a number of operations that the controller must perform during data recovery operations.

It is intended that the foregoing detailed description be regarded as illustrative rather than limiting, and that it be understood that it is the following claims, including all equivalents, that are intended to define the spirit and scope of this invention.

The invention claimed is:

1. A method for performing data recovery comprising:
after detection of an error at a first page of memory cells of a memory chip, where the memory chip is divided into two or more planes and each plane of the two or more planes is divided into pages of memory cells, identification of a data keep cache that is associated with the first page, the data keep cache associated with a primary XOR sum that has been calculated across data stored in the memory chip, and identification of a plurality of pages of memory cells other than the first page that are associated with the data keep cache, performing the following steps with controlling circuitry in the memory chip:
sensing data stored at a second page of memory cells of the plurality of pages of memory cells and moving the data of the second page to a first latch of the memory chip;
sensing data stored at a third page of memory cells of the plurality of pages of memory cells such that the data of the third page is present in a second latch of the memory chip;
calculating a restoration XOR sum based on the data of the second page present at the first latch and the data of the third page present at the second latch without toggling the data of the second page and the third page out of the memory chip;
moving the restoration XOR sum to a third latch of the memory chip for temporary storage;
calculating the data of the first page based on the primary XOR sum, the restoration XOR sum, and at least one plane XOR sum of a plane of the memory chip other than a plane of the memory chip where the first page of memory cells is present, where each plane XOR sum is calculated for the data stored within the pages of memory cells of that specific plane; and
restoring the data of the first page based on the calculation of the data of the first page.

2. The method of claim 1, wherein the second latch and the third latch are different latches of the memory chip.

3. The method of claim 1, wherein the second latch and the third latch are the same latch of the memory chip.

4. The method of claim 1, further comprising:
with the controlling circuitry in the memory chip:
sensing data stored at a fourth page of memory cells of the plurality of pages of memory cells such that the data of the fourth page is present in a fourth latch of the memory chip; and
updating the restoration XOR sum with the data of the fourth page such that the restoration XOR sum is present in the third latch after the update.

5. The method of claim 4, wherein the first latch and the fourth latch are different latches of the memory chip.

6. The method of claim 4, wherein the first latch and the fourth latch are the same latch of the memory chip.

7. A memory chip comprising:
non-volatile memory cells divided into two or more planes, where each plane of the two or more planes is divided into paces of memory cells;
a plurality of latches in communication with the non-volatile memory cells;
controlling circuitry in communication with the non-volatile memory cells and the plurality of latches, the controlling circuitry configured to perform data recovery and configured to, after detection of an error at a first page of the non-volatile memory cells, identification of a data keep cache that is associated with the first page, the data keep cache associated with a primary XOR sum that has been calculated across data stored in the non-volatile memory cells, and identification of a plurality of pages of the non-volatile memory cells other than the first page that are associated with the data keep cache:
sense data stored at a second page of non-volatile memory cells of the plurality of pages of non-volatile memory cells and move the data of the second page to a first latch of the plurality of latches;
sense data stored at a third page of non-volatile memory cells of the plurality of pages of non-volatile memory cells such that the data of the third page is present in a second latch of the plurality of latches;
calculate a restoration XOR sum based on the data of the second page present at the first latch and the data of the third page present at the second latch without toggling the data of the second page and the third page out of the memory chip;
move the restoration XOR sum to a third latch of the plurality of latches for temporary storage;
calculate the data of the first page based on the primary XOR sum, the restoration XOR sum, and at least one plane XOR sum of a plane of the memory chip other than a plane of the memory chip where the first pace of memory cells is present, where each plane XOR sum is calculated for the data stored within the paces of memory cells of that specific plane; and
restore the data of the first page based on the calculation of the data of the first page.

8. The memory system of claim 7, wherein the second latch and the third latch are different latches.

9. The memory system of claim 7, wherein the second latch and the third latch are the same latch.

10. The memory system of claim 7, wherein the controlling circuitry is further configured to:
sense data stored at a fourth page of non-volatile memory cells of the plurality of pages of non-volatile memory cells such that the data of the fourth page is present in a fourth latch of the plurality of latches; and
update the restoration XOR sum with the data of the fourth page such that the restoration XOR sum is present in the third latch after the update.

11. The memory system of claim 10, wherein the first latch and the fourth latch are different latches.

12. The memory system of claim 10, wherein the first latch and the fourth latch are the same latch.

13. A memory system comprising:
non-volatile memory cells divided into two or more planes, where each plane of the two or more planes is divided into paces of memory cells;

a plurality of latches in communication with the non-volatile memory cells;

means for detecting an error at a first page of the non-volatile memory cells;

means for identifying a data keep cache that is associated with the first page, the data keep cache associated with a primary XOR sum that has been calculated across data stored in the non-volatile memory cells;

means for identifying a plurality of pages of the non-volatile memory cells other than the first page that are associated with the data keep cache;

means for sensing data stored at a second page of non-volatile memory cells of the plurality of pages of non-volatile memory cells and move the data of the second page to a first latch of the plurality of latches;

means for sensing data stored at a third page of non-volatile memory cells of the plurality of pages of non-volatile memory cells such that the data of the third page is present in a second latch of the plurality of latches;

means for calculating a restoration XOR sum based on the data of the second page present at the first latch and the data of the third page present at the second latch without toggling the data of the second page and the third page out of a memory chip comprising the non-volatile memory cells and the plurality of latches;

means for moving the restoration XOR sum to a third latch of the plurality of latches for temporary storage;

means for calculating the data of the first page based on the primary XOR sum, the restoration XOR sum, and at least one plane XOR sum of a plane of the memory chip other than a plane of the memory chip where the first page of memory cells is present, where each plane XOR sum is calculated for the data stored within the paces of memory cells of that specific plane; and means for restoring the data of the first page based on the calculation of the data of the first page.

14. The memory system of claim 13, further comprising:

means for sensing data stored at a fourth page of non-volatile memory cells of the plurality of pages of non-volatile memory cells such that the data of the fourth page is present in a fourth latch of the plurality of latches; and means for updating the restoration XOR sum with the data of the fourth page such that the restoration XOR sum is present in the third latch after the update.

15. The memory system of claim 14, wherein the first latch and the fourth latch are different latches.

16. The memory system of claim 14, wherein the first latch and the fourth latch are the same latch.

* * * * *